United States Patent [19]

Roper et al.

[11] Patent Number: 4,713,909
[45] Date of Patent: Dec. 22, 1987

[54] INDOOR AND OUTDOOR CLOTH FARM

[76] Inventors: Peter Roper, 957 E. 224th St., Bronx, N.Y. 10466; George Spector, 233 Broadway, 3615 Woolworth Bldg., New York, N.Y. 10007

[21] Appl. No.: 363,292

[22] Filed: Mar. 29, 1982

Related U.S. Application Data

[63] Continuation of Ser. No. 905,475, May 12, 1978, abandoned.

[51] Int. Cl.⁴ ............................................. A01G 9/02
[52] U.S. Cl. ............................................. 47/17; 47/66
[58] Field of Search ..................... 47/59–61, 47/65, 39, 67, 78, 17, 76

[56] References Cited

U.S. PATENT DOCUMENTS 2,669,065  2/1954  Clegg .................................. 47/76

Primary Examiner—Robert E. Bagwill
Attorney, Agent, or Firm—Peter Roper; George Spector

[57] ABSTRACT

A farm structure for growing plants or crop in a small area or increasing an area for farming, composed of several tiers of cloth, one above another, each cloth supporting a quantity of earth in which plants are growing; water used in watering plants on the uppermost tier, dripping downward successively through at the tiers, so to water the plants in each tier; extra layers of cloth snapped under any tier for greater water retention, flood lights under each tier, giving light to plants in a tier therebelow and warming a soil thereabove, and an elevator mechanism for lowering the tiers of a large outdoor model, so that harvesting can be done more efficiently at a ground level.

4 Claims, 9 Drawing Figures

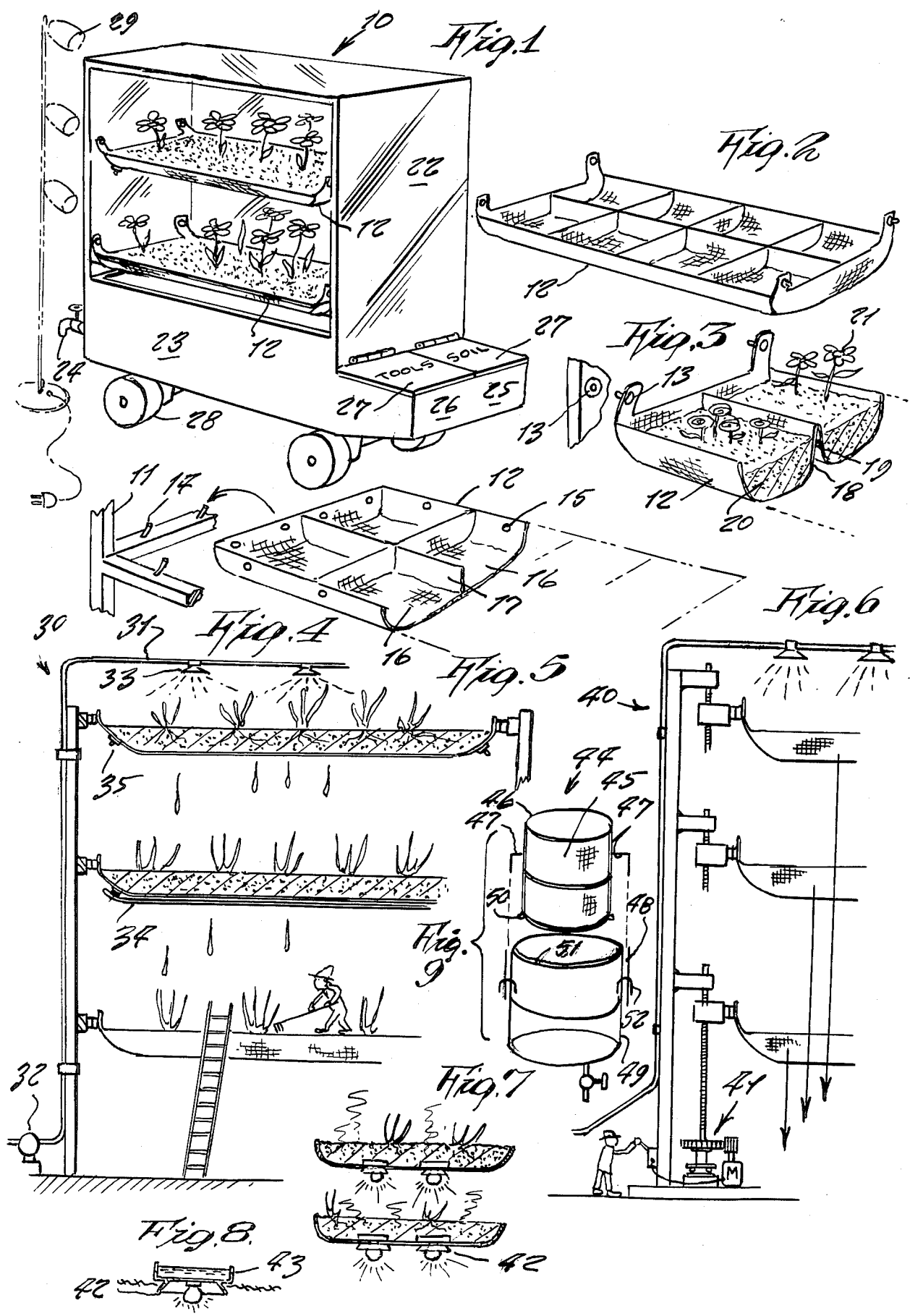

INDOOR AND OUTDOOR CLOTH FARM

This is a continuation of application Ser. No. 905,475, filed May 12, 1978, now abandoned.

This invention relates generally to miniature farms.

A principal object of the present invention is to provide a miniature farm in which plants are grown in tiers one above another, so to require less ground area.

Another object is to provide a miniature farm in which each tier includes a horizontal cloth holding a quantity of earth in which the plants grow, and irrigation water provided to the plants in the uppermost tier, dripping therethrough and through successive tiers therebelow, so to water all the plants in each tier with a single watering at the top.

Another object is to provide a cloth farm which may be made on either a small or large scale for indoor or outdoor installation.

Still another object is to provide a cloth farm wherein extra cloths snapped under a tier gives greater water retention in the tier, as needed by plants.

Still another object is to provide a cloth farm in which flood lights under a tier for plants therebelow also serves to give moist heat to roots of plants thereabove.

FIG. 1 is a perspective view of a small indoor model of the invention.

FIG. 2 is a perspective view of one of the cloth platforms shown above.

FIG. 3 is an enlarged detail thereof so to illustrate the snap fasteners that support it.

FIG. 4 shows another design of cloth platform support consisting of eyelets on the cloth and hooks on the frame.

FIG. 5 is a side view, partly in cross section, of a large commercial out-of-door model.

FIG. 6 is a detail of another out-of-door model in which the platforms can be lowered for purpose of seeding, hoeing or harvesting more conveniently and safely at ground level.

FIG. 7 is a cross section of another design of cloth platform, in which electric lights underneath serve to provide light for plants in a next lower cloth platform, the light also serving to heat and humidify water in the soil thereabove, so to create improved environment for the growing plants.

FIG. 8 shows the lamp of FIG. 7 above, and indicates a pan thereabove to catch some water which it heats and vaporizes.

FIG. 9 is a view of another design of the invention in which a cloth pot is held in on inner shell supported over an outer shell.

Referring now to the drawing in greater detail, and more particularly to FIGS. 1 through 4 thereof at this time, the reference numeral 10 represents a cloth farm according to the present invention, which is of indoor type. It includes a frame 11 that supports several tiers of cloth 12, one above the other, either by means of interconnecting snap fasteners 13 on the frame and cloth corners, or by means of pegs 14 on frame hooking into grommet openings 15 along the cloth edges.

The cloth may be stitched so to form individual compartments 16 by means of cloth partitions 17 therebetween or simply by upward folds 18 supported over beams 19 of the frame. Soil 20 is placed on the supported cloth to a depth sufficient for growing the plants 21.

The model of cloth farm shown in FIG. 1 includes enclosing partitions 22 around sides thereof, which may comprise mirrors so to reflect the images of flowers growing therein for a more rich display. Outer sides of partitions may be decorated with designs or paintings, as preferred.

Beneath a lowermost tier, a tank 23 serves to catch and hold the dripped water for re-use conservation. A spigot 24 is provided for draining water from the tank. The frame also encloses a bin 25 for extra soil and a bin 26 for tools, the bins being closable by hinged covers 27. The frame is supported upon wheels 28 so that the cloth farm can be moved between different areas of a house.

A nearby floor lamp 29 gives light to plants on the different tiers.

In FIG. 5 a cloth farm 30 is large so to be for outdoor use, and includes the above described cloths and frame for the soil and plants. In this design water to the uppermost tier is provided through watering system 31, in which a motor-driven pump 32 delivers water to sprinklers 33.

FIG. 3 also clearly shows that additional cloths 34 can be snapped to the underside of cloth 12 by means of snap fasteners 35 for increasing water retention in a tier.

In FIG. 6, an outdoor cloth farm 40 is the same as outdoor cloth farm 30 except that a mechanism 41 is included for each tier, so to lower the same to a ground level at time of harvesting so to be more convenient.

In FIGS. 7 and 8 illuminating lamps 42 secured to underside of a cloth, give light to plants in a tier therebelow. A pan 43 integral with the lamp frame serves to hold downward draining water in the soil, so that heat from the lamp therebelow heat the water so to humidify the soil in a warmed manner and thus promote better root growing conditions.

In FIG. 9 there is shown another design 44 of the invention that includes cloth pot 45 in an inner shell support frame 46 having sideward arms 47 placable in grooves 48 of an outer shell 49. Snap fasteners 50 are along a lower edge of the frame 46. The outer shell includes a sponge lining 51 and also includes locks 52 at bottom of grooves 48 so to lock the arms 47 therein. A saucer 49 is at the bottom of the outer shell, and a spigot 50 therebeneath serves to drain water out therefrom.

In the present invention, the food or flower production formula of $D/R=M$, applies wherein D equals a depth (of soil), R equals root length and M equals the multiplier Factor to determine the number of plantings possible for each type plant.

What is claimed as new is:

1. A plant cultivator comprising a cloth structure adapted to hold cultivating material for growing plants with means for varying retention of irrigating liquid in said cultivator in combination with means for supporting said structure in horizontal position at various elevations above a base surface wherein said structure includes a plurality of vertically spaced superimposed sections, first said means comprising removable cloth layers.

2. A cultivator as in claim 1 second said means comprise movable supports for each section, said supports being driven by a mechanism to position said sections at variable elevations, wherein said supports are mounted on vertical members.

3. A plant cultivator comprising a structure supporting moveable vertically spaced superimposed cloth layers, adapted to hold cultivating material for growing plants, wherein each layer comprises removeable sections.

4. A cultivator as in claim 3, wherein said structure further comprises movable supports for each layer, said supports being driven by a mechanism to position said layers at various elevations wherein said supports are mounted on vertical members.

* * * * *